Figure 1:
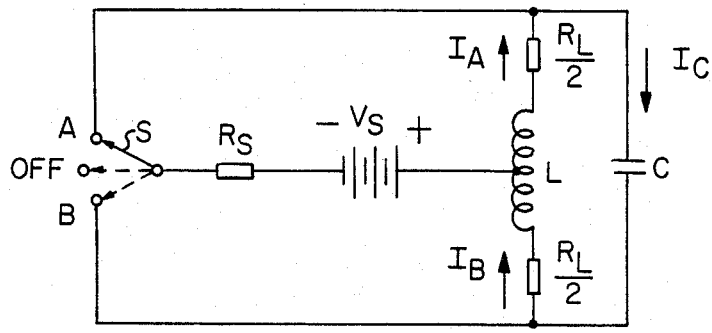

United States Patent [19]

Ensing

[11] Patent Number: 4,535,292
[45] Date of Patent: Aug. 13, 1985

[54] TRANSMITTER FOR AN ELECTROMAGNETIC SURVEY SYSTEM WITH IMPROVED POWER SUPPLY SWITCHING SYSTEM

[75] Inventor: Lukas Ensing, Rijswijk, Netherlands

[73] Assignee: Shell Internationale Research Maatschappij B.V., Netherlands

[21] Appl. No.: 365,298

[22] Filed: Apr. 5, 1982

[30] Foreign Application Priority Data

Apr. 14, 1981 [GB] United Kingdom ............... 8111781

[51] Int. Cl.$^3$ .................. G01V 3/10; G01V 3/16
[52] U.S. Cl. .................. 324/330; 324/334; 361/156
[58] Field of Search ......... 324/326, 329, 330, 332, 324/334–336, 359–362; 307/11, 29, 38, 41, 53, 104; 328/60–63, 65; 361/153, 155, 156

[56] References Cited

U.S. PATENT DOCUMENTS

| | | | |
|---|---|---|---|
| 2,169,685 | 8/1939 | Evjen | 324/359 X |
| 2,623,924 | 12/1952 | Cartier et al. | 324/330 |
| 2,735,980 | 2/1956 | Wait | 324/336 |
| 2,839,751 | 6/1958 | Ronka | 324/332 X |
| 2,903,642 | 9/1959 | Seigel | 324/330 X |
| 2,931,973 | 4/1960 | Puranen | 324/330 X |
| 3,020,471 | 2/1962 | Barringer | 324/336 |
| 3,143,689 | 8/1964 | Hall | 361/156 X |
| 3,168,694 | 2/1965 | Slattery | 324/334 |
| 3,315,155 | 4/1967 | Colani | 324/336 X |
| 3,317,744 | 5/1967 | Geleynse | 324/330 X |
| 3,950,695 | 4/1976 | Barringer | |
| 4,157,579 | 6/1979 | Paul | 304/330 X |
| 4,276,484 | 6/1981 | Riveros | 324/334 X |

FOREIGN PATENT DOCUMENTS

| | | |
|---|---|---|
| 848428 | 9/1960 | United Kingdom . |
| 2054159 | 2/1981 | United Kingdom . |
| 2054158 | 2/1981 | United Kingdom . |

*Primary Examiner*—Gerard R. Strecker
*Attorney, Agent, or Firm*—Pravel, Gambrell, Hewitt & Kimball

[57] ABSTRACT

A transmitter, to be used in an airborne or ground electromagnetic survey system for detecting conductive bodies in an area, said system being adapted to generate a frequency modulated signal and radiating it to the said area, the said transmitter being provided with a power supply means being adapted to be connected by switch means to at least two circuits, each circuit comprising a radiating means, said radiating means being adapted to be connected to the power supply means, in such a way that assembled radiation means are present, each circuit comprising a radiating means being connected by its own switch to the said power supply means.

10 Claims, 6 Drawing Figures

TRANSMITTER FOR AN ELECTROMAGNETIC SURVEY SYSTEM WITH IMPROVED POWER SUPPLY SWITCHING SYSTEM

The invention relates to a transmitter for an electromagnetic survey system. Such a system is used to detect or to sense remotely conductive bodies being present in an area. Examples of such conductive bodies are metals such as copper, lead or zinc.

Such a detection or remote sensing is used as a method of mineral exploration. This can be done by an airborne or a ground system radiating signals to the said area and receiving induced signals, generated by the said conductive bodies.

Such a method is based upon the fact that many mineral deposits contain a sufficient concentration of ores to make them strongly conductive in comparison to the surrounding materials.

Geophysical electromagnetic prospecting systems for detecting such deposits are already known. These systems use inductive electromagnetic fields generated by transmitting coils carrying alternating currents, which induce eddy currents within subsurface conductive bodies. These eddy currents will generate secondary electromagnetic fields which combine with the primary inducing field to produce resultant electromagnetic fields. These resultant electromagnetic fields may be detected with suitable pick-up devices and in such a way an indication of the presence of conductive bodies can be obtained.

Further systems have been developed which generate a primary electromagnetic field defined by a periodic frequency-modulated signal. Such a signal may be a rapidly swept signal. Such a primary field can be generated by passing current produced by a transmitter through a multi-turn loop, which is installed on an aircraft or other vehicle. Generating such a swept signal is known as such and will not be described in detail.

These known systems have several limitations, in particular as to the band-width of the system and the capacity of discovering conductive bodies on a great depth. The band-width of the electromagnetic sources used is too narrow, and often the response is measured at two or three fixed frequencies only.

As a result, present electromagnetic systems are depth-limited. Indeed, under favourable conditions their penetration is at most 200 m while conductive cover can sometimes completely screen out deeper anomalies. Reliable separation of bedrock anomalies from near surface noise is hampered by their narrow frequency band. Preliminary modelling of geological models suggests that electromagnetic transmitters should have a certain dipole moment and a band-width between 100 Hz and several KHz. This dipole moment arises from the practical requiement of being capable of detecting a three-dimensional compact conductor at least at a depth equal to its largest diameter.

It is an object of the invention to provide an electromagnetic transmitter system having a wide band spectrum with the required large dipole moment.

It is another object of the invention to provide a transmitter system, which is very suitable for detecting conductive bodies on several depths, having a significant improvement in depth-penetration.

The invention therefore provides a transmitter, to be used in an airborne or ground electromagnetic survey system for detecting conductive bodies in an area, said system being adapted to generate a frequency modulated signal and radiating it to the said area, the said transmitter being provided with a power supply means being adapted to be connected by switch means to at least two circuits, each circuit comprising a radiating means, said radiating means being further adapted to be connected to the power supply means, in such a way that assembled radiation means are present, each circuit comprising a radiating means being connected to its own switch to the said power supply means.

As already indicated in the above, the invention is based upon the fact that in order to obtain proper signals to detect or to sense remotely conductive bodies in an area it is necessary to develop transmitters having a determined dipole moment, said transmitters using a fundamental wave form, which consists of an almost square wave. This almost square wave is used to generate a wide band spectrum by changing its period with time. In order to provide an almost square wave form it is necessary to obtain proper zero crossings of the signal. The transmitter of the invention provides such signals.

Figure 3:
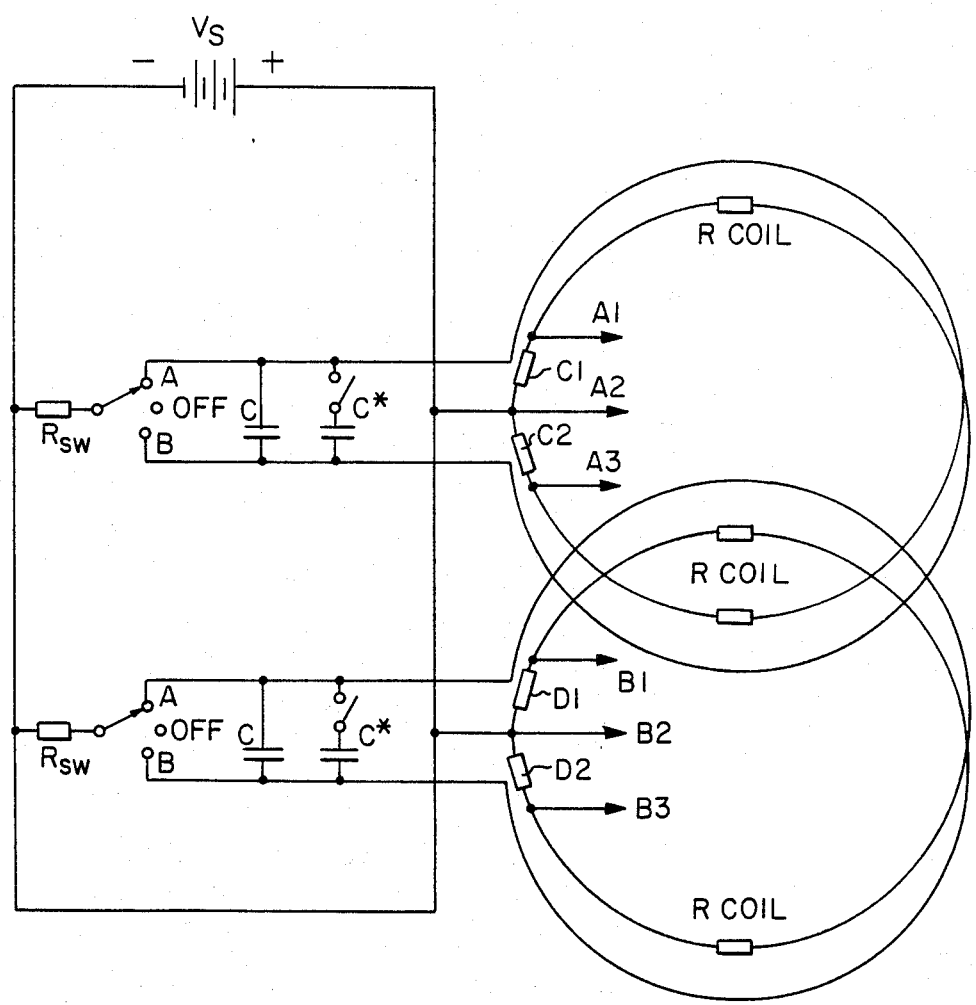
Figure 2A:
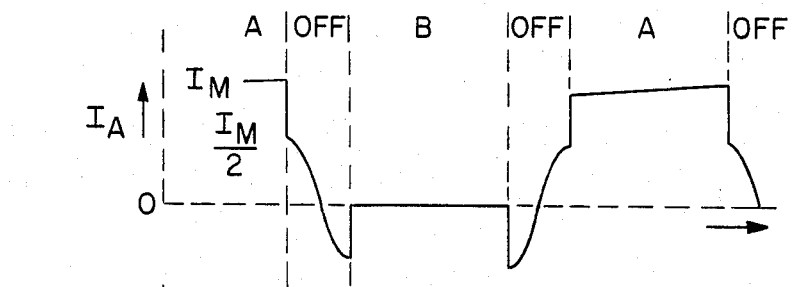
Figure 2B:
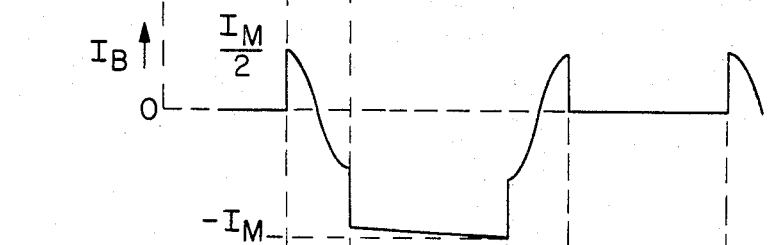
Figure 2C:
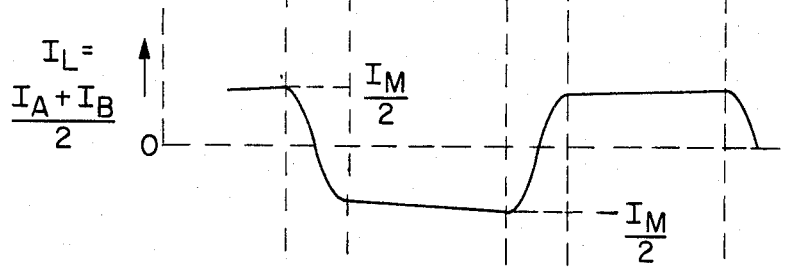
Figure 2D:
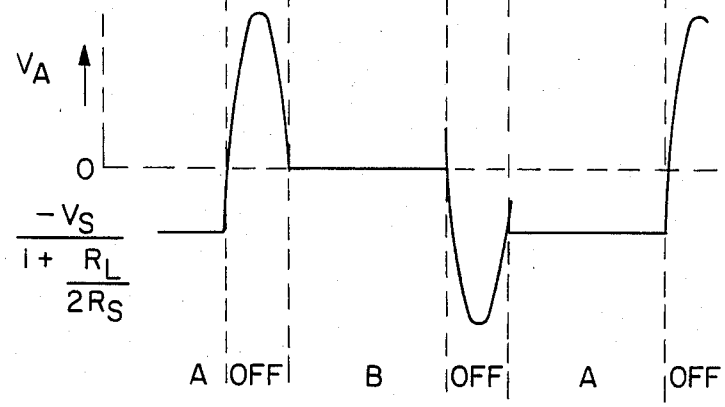

The invention will now be described by way of example in more detail with reference to the accompanying drawings, in which:

FIG. 1 represents schematically an example of a basic circuit, which is used in a transmitter for an electromagnetic survey system;

FIGS. 2a–d show currents and voltages being present in the circuit of FIG. 1;

FIG. 3 shows an embodiment of the invention.

With reference to FIGS. 1 and 2a–d a basic transmitter circuit consisting of a push-pull electromagnetic coil driving circuit and its currents and voltages have been represented. The transmitter has been provided with a power supply $V_s$ which at one side is connected by any means suitable for the purpose to a switch S (schematically shown) and at its other side to a driving circuit comprising a capacitor C and a coil L. The switch S is operated at any suitable way in a certain sequence of positions, in this example A - OFF - B - OFF - A ... etc. The coil resistance has been represented schematically as $R_L$, whereas the supply resistance has been represented schematically as $R_s$. The coil L has been tapped in such a way that two equal coil halves exist, each having a coil resistance $$\frac{R_L}{2}$$

(schematically shown).

When the switch is in the A-position, at t= −0 a current $$(I_A)_o = \frac{V_s}{R_s + \frac{R_L}{2}}$$

is flowing through the upper coil half. When the switch is in the OFF-position, at t= +0 the said current is flowing through the L-C-circuit and divided between both the coil halves. This current is also flowing through the capacitor C. As known to those skilled in the art in this way a magnetic field is maintained:

$$(I_A) + o = (I_B) + o = \frac{(I_A) - o}{2} = I_C \quad \text{(vide FIGS. 1 and 2a-d)}$$

If the switch is in the OFF-position the current through the circuit is a "dampened sine" having a damping which is determined by the coil-series resistance $R_L$ and by other damping-contributions for example: parallel resistance of coil and capacitor; series resistance of the capacitor; radiation resistance of the coil, etc.

Thus, if the switch should remain in the OFF-position the currents $I_A$ and $I_B$ and the voltage $V_A$ (vide FIGS. 2a-d) would be damped after some time.

In FIGS. 2a-d the horizontal axes represent time, whereas the vertical axes represent $$I_A, I_B, I_L = \frac{I_A + I_B}{2} \text{ and } V_A$$

respectively. The coil current changes sign when the switch is in the OFF-position. However, only a half-period of the dampened oscillation is present. After said half-period the switch S is conected to its B-position. When in the B-position, the tuned circuit, composed of the tapped transmitter coil L and the tuning capacitor C, is so heavily damped, that the current $I_B$ aperiodically rises to the value $$I_M = \frac{V_s}{R_s + \frac{R_L}{2}},$$

whereas the current $I_A = I_C$ is decreasing to zero.

This transition may happen with a high-frequency dampened oscillation, which is caused by parasite capacitors in the coil halves. If the switch position B is opened, the next procedure begins for another half-period of the tuned L-C-circuit and ends if the A-position is closed.

In the foregoing it is supposed that the ON-periods of A and B are such, that $I_A$ respectively $-I_B$ and the value $$I_M = \frac{V_s}{R_s + \frac{R_L}{2}}$$

is obtained.

This will not always happen. Therefore the resulting maximum value of the current will be lower at high repetition frequencies than at low repetition frequencies.

The connection of the switch to the B-respectively A-position should be synchronized with the zero-crossing of the voltage $V_A$ respectively $V_B$. This may happen by means of electronic power switches such as suitable switching transistors and by inserting a diode in series to each collector of the said transistor. It will be clear to those skilled in the art that any switching means suitable for the purpose may be used.

FIG. 3 represents schematically a device according to the invention, comprising a transmitter provided with two circuits, each circuit comprising a two-turn coil in such a way that two assembled two-turn coils are present, each driven by its own switch. The resistance of the switches have been indicated schematically as $R_{sw}$. The resistance of each turn of each coil has been indicated schematically as $R_{coil}$. Further each turn of each coil is provided with a calibrated series-resistance and connections $A_1$, $A_2$, $A_3$ and $B_1$, $B_2$, $B_3$ respectively to a current meter circuit (not shown, since known per se). The resistance connected in series with these connections are schematically shown as $C_1$, $C_2$ and $D_1$, $D_2$ respectively. The switches driving the coils are switched simultaneously by any means suitable for the purpose (not shown, since known per se). In this embodiment a relay switch C* is present in the circuit comprising the radiating means. It will be clear that any number of assembled coils suitable for the purpose is possible. An advantageous number of assembled coils is 10. Further the same reference numbers as used in FIG. 1 have been indicated.

The power supply $V_s$ may be a 12 V battery. It will be appreciated that any radiation means suitable for the purpose may be used. Further it should be clear, that coils having any suitable number of turns may be used.

It will also be appreciated that any electronic switch suitable for the purpose may be used.

It will be clear to those skilled in the art that several ways of obtaining the required currents are possible. So the invention is not restricted to using a tapped coil.

Instead the whole coil itself may be switched alternately at its both connections to provide the required currents. Another advantageous embodiment of the invention comprises a tapped power supply instead of a tapped coil. In this embodiment the one side of the L-C-circuit is connected to its switch by any means suitable for the purpose, whereas the other side of the L-C-circuit is connected to the power supply, by any means suitable for the purpose, in such a way, that two equal power supply halves exist. It will be clear to those skilled in the art that the switch also has been connected by any means suitable for the purpose to both terminals of the said power supply. In this embodiment one-turn coils may be used.

Various modifications of the invention will become apparent to those skilled in the art from the foregoing description and accompanying drawings. Such modifications are intended to fall within the scope of the appended claims.

I claim:

1. A geophysical large dipole moment transmitter for an airborne electromagnetic inductive survey system for emitting primary electromagnetic signals to the earth for the purpose of detecting conductive bodies at a large depth in an area by means of measuring secondary electromagnetic signals which are generated by eddy currents induced in the earth by the primary electromagnetic signals, said transmitter comprising: a unit comprising a plurality of assembled or stacked transmitting coils of large diameter for installation on an aircraft for radiating a primary electromagnetic signal to the area; a power supply means for said coils; a plurality of switches for connecting said power supply means to said coils; each of said coils connected through its own switch to said power supply means, and means for activating said switches of said coils simultaneously.

2. The transmitter as claimed in claim 1, wherein said plurality of assembled coils comprises two assembled coils.

3. The transmitter as claimed in claim 2, wherein said assembled coils are tapped coils, the tap of said coils being connected to said power supply means.

4. The transmitter as claimed in claim 2 or 3, wherein said assembled coils are multi-turn coils.

5. The transmitter as claimed in claim 4, in which said assembled coils are two-turn coils.

6. The transmitter as claimed in claim 1, further including a circuit between each said coil and its switch comprising a capacitor.

7. The transmitter as claimed in claim 1, further including a circuit between each said coil and switch comprising a relay switch.

8. The transmitter as claimed in claim 1, wherein said plurality of assembled coils comprises ten coils, each connected through its switch to said power supply means.

9. The transmitter as claimed in claim 1, wherein said power supply means is a tapped power supply, the tap of said power supply being connected to each of said coils.

10. The transmitter as claimed in claim 9, wherein said coils are one-turn coils.

* * * * *